United States Patent
Peng et al.

(10) Patent No.: US 12,386,524 B2
(45) Date of Patent: Aug. 12, 2025

(54) METHOD FOR CONTROLLING FLASH MEMORY MODULE AND ASSOCIATED FLASH MEMORY CONTROLLER AND MEMORY DEVICE

(71) Applicant: Silicon Motion, Inc., Hsinchu County (TW)

(72) Inventors: Kuan-Chieh Peng, Taoyuan (TW); Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/592,458

(22) Filed: Feb. 29, 2024

(65) Prior Publication Data
US 2025/0053313 A1 Feb. 13, 2025

(30) Foreign Application Priority Data
Aug. 7, 2023 (TW) .................................. 112129562

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

| | | | |
|---|---|---|---|
| 2014/0153333 A1* | 6/2014 | Avila ................ | G11C 16/3445 365/185.11 |
| 2014/0269074 A1* | 9/2014 | Kuo ...................... | G11C 29/82 365/185.12 |
| 2015/0009754 A1 | 1/2015 | Kim | |
| 2019/0087128 A1* | 3/2019 | Shin .................... | G06F 12/0246 |
| 2020/0042200 A1* | 2/2020 | Kanno ................. | G06F 3/0688 |
| 2021/0158868 A1 | 5/2021 | Prabhakar | |
| 2021/0241804 A1 | 8/2021 | Park | |
| 2022/0261180 A1 | 8/2022 | Shin | |
| 2022/0392540 A1* | 12/2022 | Trivedi ................ | G11C 16/16 |
| 2023/0395167 A1* | 12/2023 | Fujimori ............... | G11C 16/16 |

FOREIGN PATENT DOCUMENTS

TW 202137220 A 10/2021

* cited by examiner

*Primary Examiner* — Hiep T Nguyen
(74) *Attorney, Agent, or Firm* — Winston Hsu

(57) ABSTRACT

The present invention provides a method for controlling a flash memory module. The flash memory module includes a plurality of dies, each die includes a plurality of blocks, each block includes a plurality of pages, and the method includes the steps of: selecting a super block, wherein the super block includes a plurality of first blocks respectively located in the plurality of dies; for each first block in the super block, determining whether the first block is a full block or a blank block; and if the first block is not the full block or the blank block, writing dummy data to the first block so that the first block becomes the full block; and erasing the plurality of first blocks in the super block, so that the plurality of first blocks become a plurality of blank blocks.

12 Claims, 4 Drawing Sheets ly, the memory not the full

METHOD FOR CONTROLLING FLASH MEMORY MODULE AND ASSOCIATED FLASH MEMORY CONTROLLER AND MEMORY DEVICE

BACKGROUND OF THE INVENTION

1. Field of the Invention

The present invention relates to a flash memory.

2. Description of the Prior Art

In the flash memory module, a block is used as an erase unit, that is, the erase operation can only be performed in units of blocks, and data of memory units of all pages within the block will be erased together. However, for some flash memory modules, if the erase operation is performed on a block where some pages have not yet been written, it may affect the subsequent write operation of this block, thereby reducing the quality of the data stored in the block.

SUMMARY OF THE INVENTION

It is therefore an objective of the present invention to provide a method for accessing the flash memory module, which can efficiently determine whether a block has unwritten page(s) before the block is erased, and redundant data is written into the page(s) where data has not been written, so as to solve the problems described in the prior art.

According to one embodiment of the present invention, a method for controlling a flash memory module is disclosed. The flash memory module comprises a plurality of dies, each die comprises a plurality of blocks, each block comprises a plurality of pages, and the method comprises: selecting a super block, wherein the super block comprises a plurality of first blocks respectively located in the plurality of dies; for each first block in the super block, determining whether the first block is a full block or a blank block; and if the first block is not the full block or the blank block, writing dummy data to the first block so that the first block becomes the full block; and erasing the plurality of first blocks in the super block, so that the plurality of first blocks become a plurality of blank blocks.

According to one embodiment of the present invention, a flash memory controller configured to access a flash memory module is disclosed. The flash memory module comprises a plurality of dies, each die comprises a plurality of blocks, each block comprises a plurality of pages, and the flash memory controller comprises: a read-only memory configured to store a program code, and a microprocessor configured to execute the program code to access the flash memory module. The microprocessor is configured to perform the steps of: selecting a super block, wherein the super block comprises a plurality of first blocks respectively located in the plurality of dies; for each first block in the super block, determining whether the first block is a full block or a blank block; and if the first block is not the full block or the blank block, writing dummy data to the first block so that the first block becomes the full block; and erasing the plurality of first blocks in the super block, so that the plurality of first blocks become a plurality of blank blocks.

According to one embodiment of the present invention, a memory device comprising a flash memory module and a flash memory controller is disclosed. The flash memory module comprises a plurality of dies, each die comprises a plurality of blocks, each block comprises a plurality of pages. The flash memory controller, configured to access the flash memory module, and the flash memory controller is configured to perform the steps of: selecting a super block, wherein the super block comprises a plurality of first blocks respectively located in the plurality of dies; for each first block in the super block, determining whether the first block is a full block or a blank block; and if the first block is not the full block or the blank block, writing dummy data to the first block so that the first block becomes the full block; and erasing the plurality of first blocks in the super block, so that the plurality of first blocks become a plurality of blank blocks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
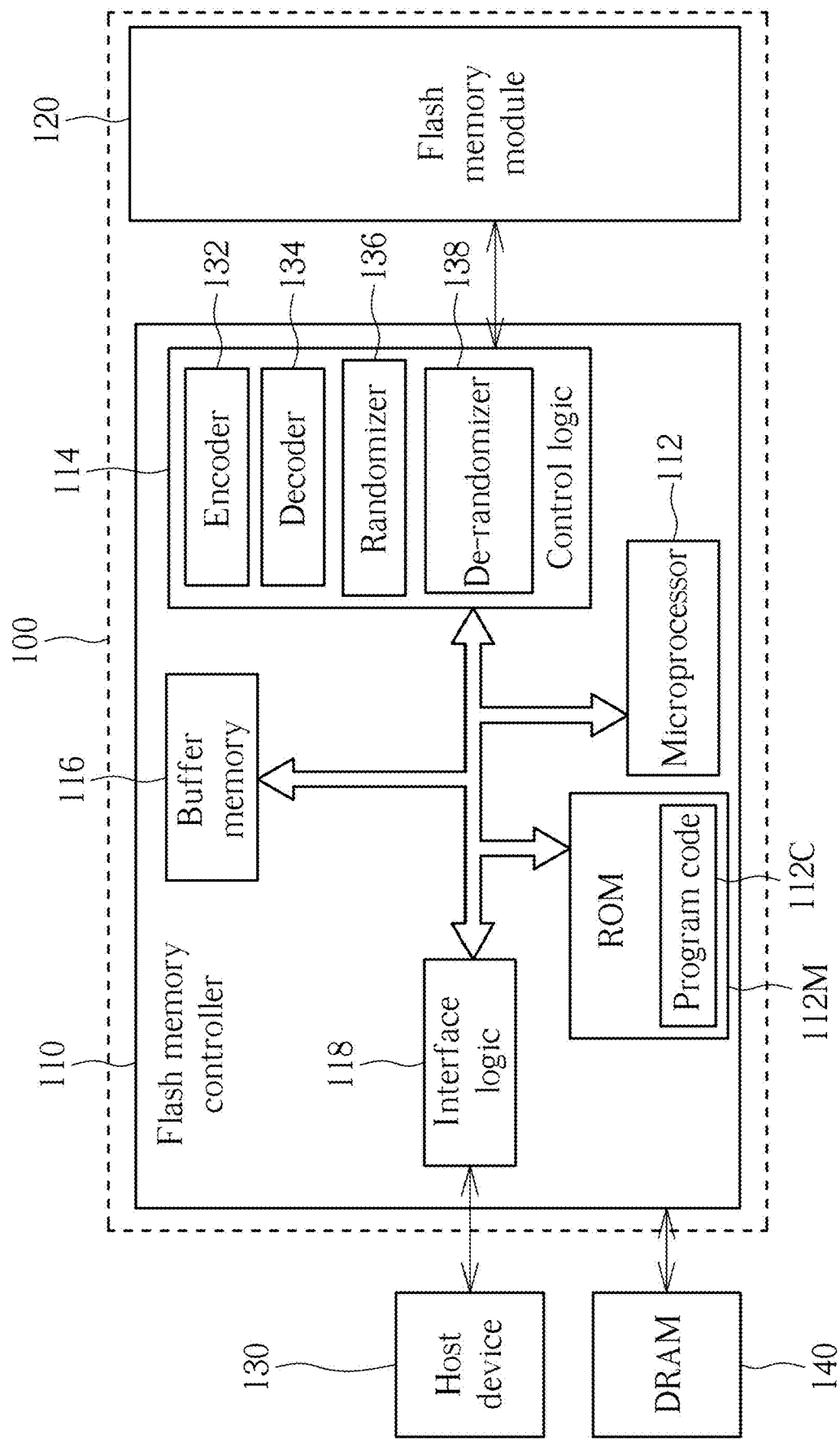
FIG. 1 is a diagram illustrating a memory device according to an embodiment of the present invention.

FIG. 1 is a diagram illustrating a memory device 100 according to an embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116 and an interface logic 118. The ROM 112M is arranged to store a program code 112C, and the microprocessor 112 is arranged to execute the program code 112C to control access of the flash memory module 120. The control logic 114 includes an encoder 132, a decoder 134, a randomizer 136 and a de-randomizer 138. The encoder 132 is arranged to encode data that is written into the flash memory module 120 to generate a corresponding parity (also known as an error correction code (ECC)), and the decoder 134 is arranged to decode data that is read from the flash memory module 120. The randomizer 136 is used to randomize the data written to the flash memory module 120, and the de-randomizer 138 is used to de-randomize the data read from the flash memory module 120.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 and/or a DRAM 140 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

Figure 2:
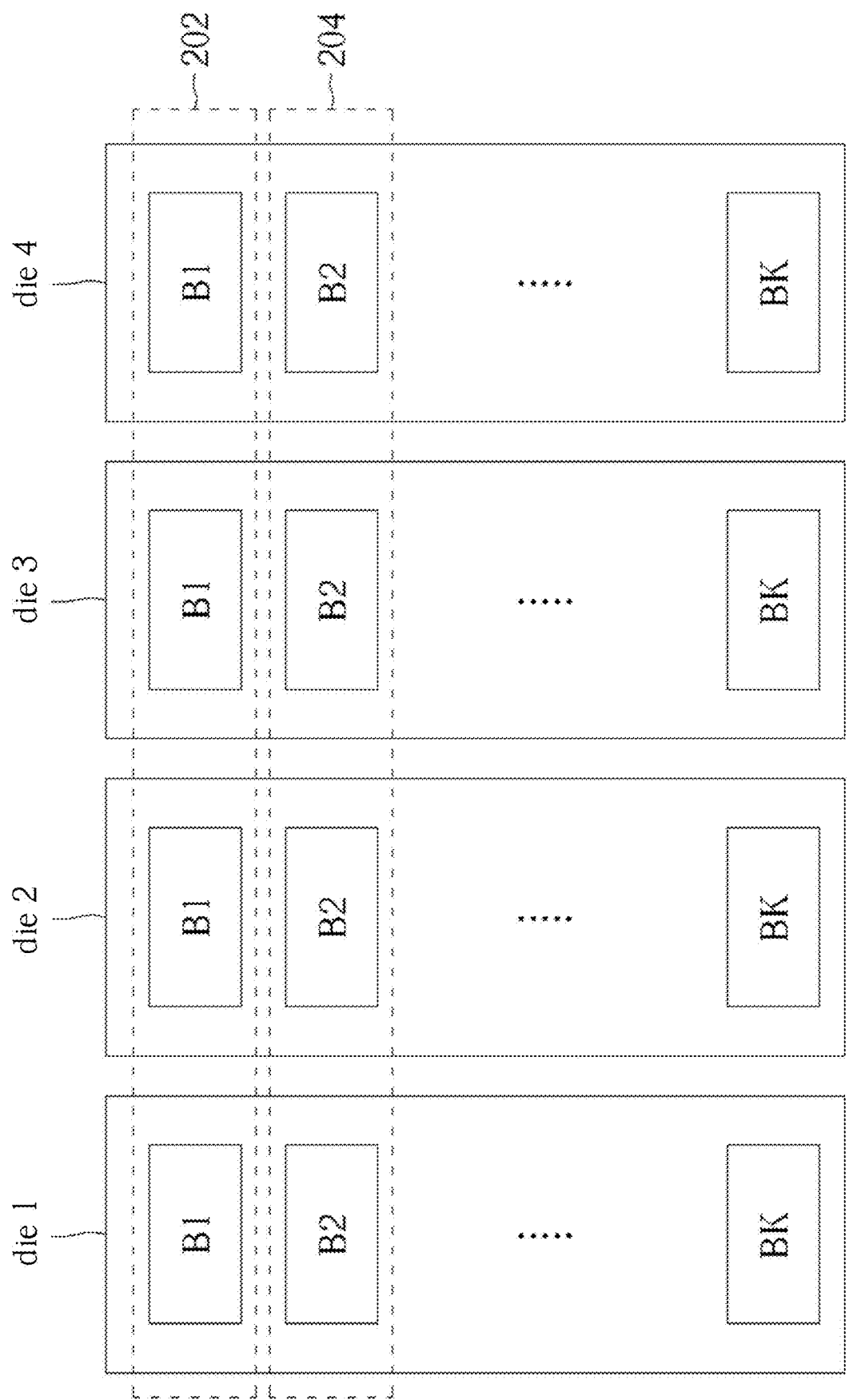
FIG. 2 is a diagram of a super block according to an embodiment of the present invention.

FIG. 2 is a diagram of a super block according to an embodiment of the present invention. As shown in FIG. 2, it is assumed that the flash memory module 120 includes four dies (die 1 to die 4), and each die includes a plurality of blocks B1-BK. At this time, the microprocessor 112 can configure blocks belonging to different data planes or different dies within the flash memory module 120 as a super block to facilitate management of data access. In this embodiment, there is only one data in one die, but the invention is not limited to this. As shown in FIG. 2, die 1 to die 4 respectively include blocks B1-BK, and the microprocessor 112 can configure the block B1 of each die as a super block 202, and configure the block B2 of each die as a super block 204, and so on. The operation of the flash memory controller 110 in accessing the super blocks 202 and 204 is similar to accessing the general blocks. For example, the super block 202 itself is an erase unit. That is, although the four blocks B1 included in the super block 202 can be erased separately, the flash memory controller 110 will definitely erase the four blocks B1 together.

Figure 3:
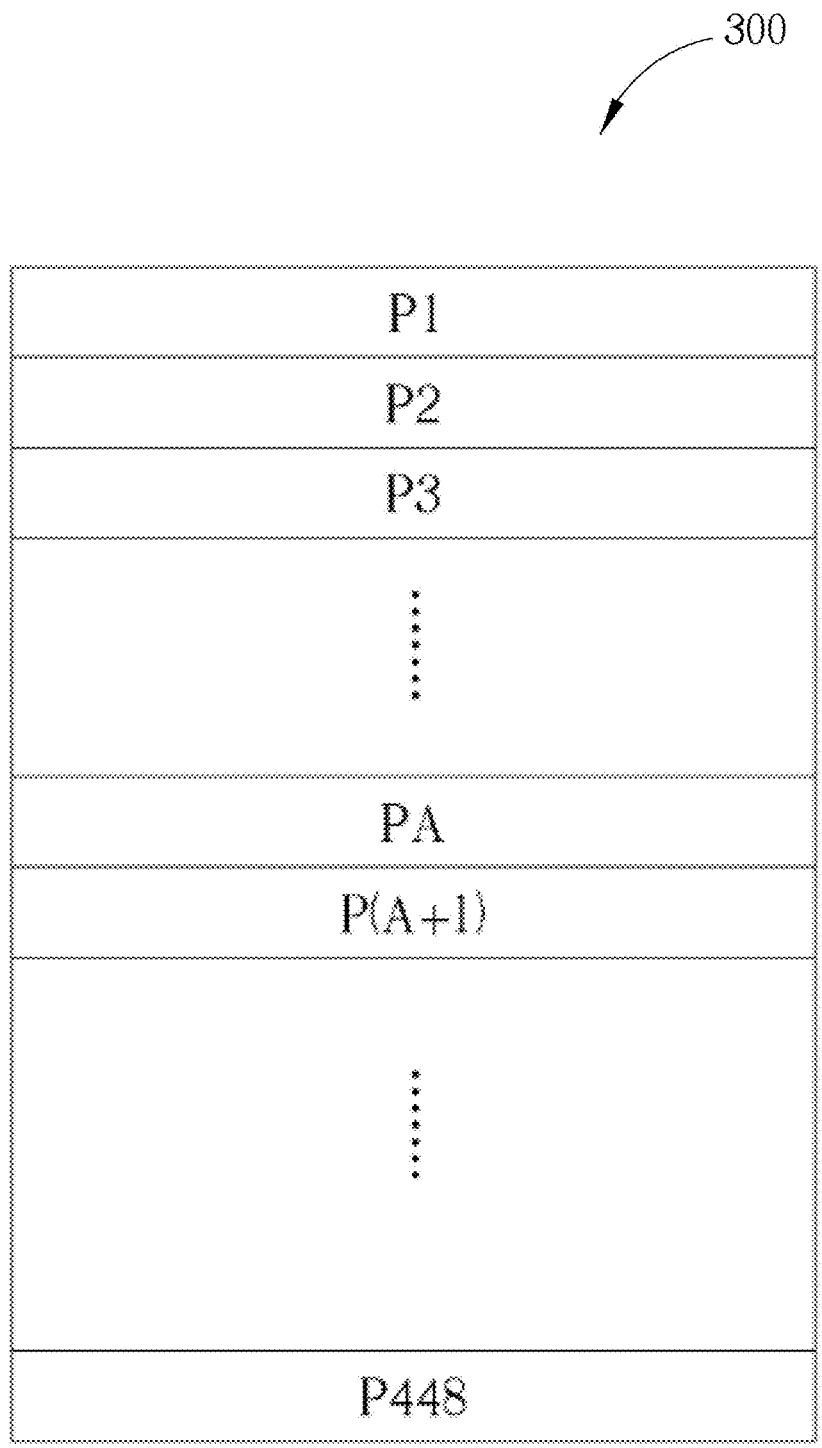
FIG. 3 shows a block including a plurality of pages.

FIG. 3 is a diagram illustrating a block 300, wherein the block 300 can be any one of the blocks B1-BK shown in FIG. 2, and the block 300 includes a plurality of pages, such as 448 pages in the figure. When writing data to the super block 202, the first page P1 of the block B1 of the die 1, the first page P1 of the block B1 of the die 2, the first page P1 of the die 3 and the first page P1 of the block B1 of the die 4 can be sequentially written. Then, the data is written into the second page P2 of the block B1 of die 1, the second page P2 of the block B1 of the die 2, . . . , and so on. In other words, the flash memory controller 110 writes data to the first page P1 of each block B1 in the super block 202, and then writes data to the second page P2 of each block B1 in the super block 202. The super block is a collection block logically set by the flash memory controller 110 for the convenience of managing the flash memory module 120, not a physical collection block. In addition, when performing garbage collection, calculating the effective pages of a block, and calculating the length of writing a block, calculations can also be performed in units of super blocks.

In this embodiment, the flash memory module 120 is a three-dimensional NAND-type flash memory module, in which each block is composed of a plurality of word lines, a plurality of bit lines and a plurality of memory cells. Since the three-dimensional NAND flash memory architecture is well known to a person skilled in the art, no further explanation is given in the specification.

Figure 4:
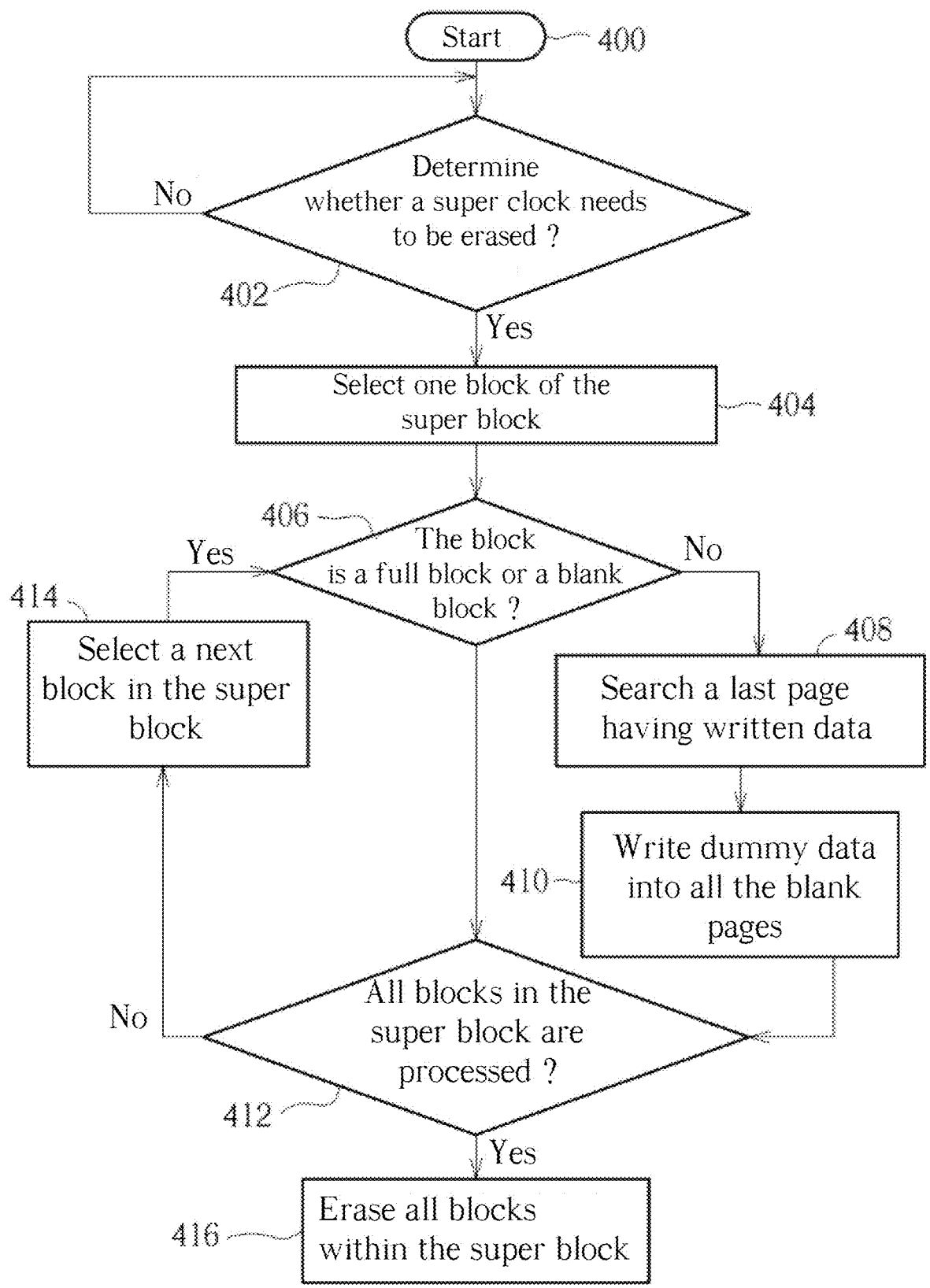
FIG. 4 is a flowchart of a control method of a memory device according to one embodiment of the present invention.

FIG. 4 is a flowchart of a control method of the memory device 100 according to one embodiment of the present invention. In Step 400, the flow starts, and the memory device is powered on. In Step 402, the microprocessor 112 in the flash memory controller 110 determines whether there is currently a super block that needs to be erased, if yes, the flow enters Step 404; and if not, the flow stays at Step 402 and continues to determine whether there is currently one super block that need to be erased. For example, the microprocessor 112 can record in the buffer memory 116 which super blocks in the flash memory module 120 are currently in an erasable state (that is, all the data stored in the super blocks is invalid data), and when the microprocessor 112 needs to write data from the host device 130 to the flash memory module 120, or the microprocessor 112 needs to perform a garbage collection operation on some blocks in the flash memory module 120, or microprocessor 112 requires a blank block for data writing, the microprocessor 112 determines that there is currently a super block that needs to be erased to generate at least one blank super block for subsequent use, and the microprocessor 112 selects at least one of the super blocks in the erasable state. In the following description, it is assumed that the super block 202 needs to be erased.

In step 404, the microprocessor 112 selects a block from the super block 202, such as the block B1 of die 1. In step 406, the microprocessor 112 determines whether the selected block is a full block or a blank block (empty block), if yes, the flow enters Step 412; and if not, the flow enters Step 408. Specifically, the microprocessor 112 can read the first page P1 of the selected block to determine whether the first page P1 has data stored therein. For example, because the microprocessor 112 will obtain logical value "1" when reading the blank page, the microprocessor 112 can determine whether the proportion of logical values "1" in the content of the first page P1 is higher than a threshold value, to determine whether the first page P1 has data. In another example, the microprocessor 112 can read the content of the spare region of the first page P1 to determine whether data has been written into the first page P1, that is, if the spare region of the first page P1 includes valid data, it is determined that the page P1 has data. If the spare area of the first page P1 only includes invalid data (for example, all the contents correspond to logical value "1"), it is determined that the first page P1 is a blank page. Then, the microprocessor 112 reads the last page P448 of the selected block to determine whether data has been written into the last page P448. If both the first page P1 and the last page P448 have data, it is determined that the selected block is a full block and the flow enters Step 412. If both the first page P1 and the last page P448 are blank, it is determined that the selected block is a blank block and the flow also enters Step 412. In addition, if data is written into the first page P1, but the last page P448 is blank, it is determined that the selected block is not a full block or a blank block (that is, a half-full block), and the flow enters Step 408.

In Step 408, the microprocessor 112 uses a binary search method or any other suitable search method to search for the last page in the selected block that has stored data therein. In Step 410, the microprocessor 112 writes dummy data to all blank pages located after the last page that has been written in the selected block, so that all pages of the selected block have written data to become a full block, wherein the dummy data can be invalid data with any data type and not corresponding to any logical address of the host device 130. Taking FIG. 3 as an example, if the microprocessor 112 determines that the last page with data written in the block 300 is PA, the microprocessor 112 will write dummy data to all of the pages P(A+1) PK.

In Step 412, the microprocessor 112 determines whether all blocks in the super block 202 have been processed (that is, all blocks have passed Step 406). If yes, the flow enters Step 416; and if not, the flow enters Step 414.

In Step 414, the microprocessor 112 selects the next unprocessed block in the super block 202, such as block B1 of die 2, and then the flow goes back to Step 406.

In Step 416, since all blocks in the super block 202 are currently full blocks or blank blocks, the microprocessor 112 can generate a control signal to the flash memory module 120 to erase all blocks in the super block 202, so that all blocks in the super block 202 become blank blocks for subsequent use.

In the embodiment of FIG. 4, since all blocks in the super block 202 are already full blocks or blank blocks when erasing, it can avoid the problem in the prior art that the subsequent writing operation of this block is affected by erasing a half-full block.

In addition, because some flash memory modules do not allow double programming, that is, pages that have already been written are not allowed to be written again before erasing, so the above Step 408 and Step 410 can avoid the problem that pages may be permanently damaged due to double programming.

In another embodiment, if the flash memory module 120 allows double programming, Step 408 can be removed from the flow of FIG. 4, and Step 410 is modified to the microprocessor 112 directly writing dummy data into all pages in the selected block, that is, the pages P1-P448 in FIG. 3 will be written with dummy data in sequence.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a flash memory module, wherein the flash memory module comprises a plurality of dies, each die comprises a plurality of blocks, each block comprises a plurality of pages, and the method comprises:
    selecting a super block, wherein the super block comprises a plurality of first blocks respectively located in the plurality of dies;
    for each first block in the super block, determining whether the first block is a full block or a blank block; and if the first block is not the full block or the blank block, writing dummy data to the first block so that the first block becomes the full block; and
    erasing the plurality of first blocks in the super block, so that the plurality of first blocks become a plurality of blank blocks;
    wherein the step of for each first block in the super block, determining whether the first block is the full block or the blank block comprises:
    reading a first page of the first block to determine whether the first page has written data;
    reading a last page of the first block to determine whether the last page has written data;
    if both the first page and the last page have written data, determining the first block to be the full block; and
    if both the first page and the last page do not have written data, determining the first block to be the blank block.

2. The method of claim 1, wherein the step of selecting the super block comprises:
    when the flash memory module requires one or more blank blocks for data writing operations, the super block is selected from a plurality of super blocks with erasable state.

3. The method of claim 1, wherein the step of if the first block is not the full block or the blank block, writing the dummy data to the first block so that the first block becomes the full block comprises:
    starting from a first blank page of the first block, writing the dummy data into all blank pages of the first block, so that the first block becomes the full block.

4. The method of claim 1, wherein the step of if the first block is not the full block or the blank block, writing the dummy data to the first block so that the first block becomes the full block comprises:
    starting from a first page of the first block, writing the dummy data into all of the pages of the first block, so that the first block becomes the full block.

5. A flash memory controller, wherein the flash memory controller is configured to access a flash memory module, the flash memory module comprises a plurality of dies, each die comprises a plurality of blocks, each block comprises a plurality of pages, and the flash memory controller comprises:
    a read-only memory, configured to store a program code;
    a microprocessor, configured to execute the program code to access the flash memory module;
    wherein the microprocessor is configured to perform the steps of:
    selecting a super block, wherein the super block comprises a plurality of first blocks respectively located in the plurality of dies;
    for each first block in the super block, determining whether the first block is a full block or a blank block; and if the first block is not the full block or the blank block, writing dummy data to the first block so that the first block becomes the full block; and
    erasing the plurality of first blocks in the super block, so that the plurality of first blocks become a plurality of blank blocks;
    wherein the step of for each first block in the super block, determining whether the first block is the full block or the blank block comprises:
    reading a first page of the first block to determine whether the first page has written data;
    reading a last page of the first block to determine whether the last page has written data;
    if both the first page and the last page have written data, determining the first block to be the full block; and
    if both the first page and the last page do not have written data, determining the first block to be the blank block.

6. The flash memory controller of claim 5, wherein the step of selecting the super block comprises:
    when the flash memory module requires one or more blank blocks for data writing operations, the super block is selected from a plurality of super blocks with erasable state.

7. The flash memory controller of claim 5, wherein the step of if the first block is not the full block or the blank block, writing the dummy data to the first block so that the first block becomes the full block comprises:

starting from a first blank page of the first block, writing the dummy data into all blank pages of the first block, so that the first block becomes the full block.

8. The flash memory controller of claim 5, wherein the step of if the first block is not the full block or the blank block, writing the dummy data to the first block so that the first block becomes the full block comprises:

starting from a first page of the first block, writing the dummy data into all of the pages of the first block, so that the first block becomes the full block.

9. A memory device, comprising:

a flash memory module, wherein the flash memory module comprises a plurality of dies, each die comprises a plurality of blocks, each block comprises a plurality of pages; and a flash memory controller, configured to access the flash memory module;

wherein the flash memory controller is configured to perform the steps of:

selecting a super block, wherein the super block comprises a plurality of first blocks respectively located in the plurality of dies;

for each first block in the super block, determining whether the first block is a full block or a blank block; and if the first block is not the full block or the blank block, writing dummy data to the first block so that the first block becomes the full block; and erasing the plurality of first blocks in the super block, so that the plurality of first blocks become a plurality of blank blocks;

wherein the step of for each first block in the super block, determining whether the first block is the full block or the blank block comprises:

reading a first page of the first block to determine whether the first page has written data;

reading a last page of the first block to determine whether the last page has written data;

if both the first page and the last page have written data, determining the first block to be the full block; and if both the first page and the last page do not have written data, determining the first block to be the blank block.

10. The memory device of claim 9, wherein the step of selecting the super block comprises:

when the flash memory module requires one or more blank blocks for data writing operations, the super block is selected from a plurality of super blocks with erasable state.

11. The memory device of claim 9, wherein the step of if the first block is not the full block or the blank block, writing the dummy data to the first block so that the first block becomes the full block comprises:

starting from a first blank page of the first block, writing the dummy data into all blank pages of the first block, so that the first block becomes the full block.

12. The memory device of claim 9, wherein the step of if the first block is not the full block or the blank block, writing the dummy data to the first block so that the first block becomes the full block comprises:

starting from a first page of the first block, writing the dummy data into all of the pages of the first block, so that the first block becomes the full block.

* * * * *